United States Patent
Mikowychok

(10) Patent No.: US 9,719,215 B2
(45) Date of Patent: *Aug. 1, 2017

(54) VIBRATOR MECHANISM USABLE WITH A CONCRETE FINISHING TOOL

(71) Applicant: Frank Mikowychok, Lincoln, CA (US)

(72) Inventor: Frank Mikowychok, Lincoln, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/208,423

(22) Filed: Jul. 12, 2016

(65) Prior Publication Data

US 2016/0319497 A1    Nov. 3, 2016

Related U.S. Application Data

(63) Continuation-in-part of application No. 14/829,394, filed on Aug. 18, 2015, now Pat. No. 9,397,531, which is a continuation of application No. 14/304,019, filed on Jun. 13, 2014, now Pat. No. 9,139,966, and a continuation-in-part of application No. 13/947,720, filed on Jul. 22, 2013, now
(Continued)

(51) Int. Cl.
| | |
|---|---|
| *E01C 19/38* | (2006.01) |
| *E01C 19/35* | (2006.01) |
| *E01C 19/40* | (2006.01) |
| *H02K 7/14* | (2006.01) |
| *H02K 7/08* | (2006.01) |
| *H02K 11/00* | (2016.01) |
| *E04G 21/06* | (2006.01) |
| *E04F 21/24* | (2006.01) |
| *H02K 5/24* | (2006.01) |
| *H02K 7/06* | (2006.01) |

(52) U.S. Cl.
CPC .............. *E01C 19/38* (2013.01); *E01C 19/35* (2013.01); *E01C 19/402* (2013.01); *E04F 21/242* (2013.01); *E04G 21/066* (2013.01); *H02K 5/24* (2013.01); *H02K 7/063* (2013.01); *H02K 7/08* (2013.01); *H02K 7/145* (2013.01); *H02K 11/0094* (2013.01)

(58) Field of Classification Search
CPC ........ E01C 19/35; E01C 19/38; E01C 19/405; E04G 21/066; E04F 21/242; H02K 7/08; H02K 7/145; H02K 11/0094; H02K 5/24; H02K 7/063
USPC .................................................. 404/113, 114
See application file for complete search history.

(56) References Cited

U.S. PATENT DOCUMENTS 2,740,336 A * 4/1956 Degen .................... E02D 3/074
404/113
5,234,283 A * 8/1993 Adkins ................. E01C 19/402
404/114

(Continued)

*Primary Examiner* — Raymond W Addie
(74) *Attorney, Agent, or Firm* — Whitley Legal Group, P.C; Ann Marie W. Whitley

(57) ABSTRACT

A remote controlled vibration imparting device for a concrete finishing tool uses a housing having a chamber surrounded by an inner surface of the housing. A vibrator with a support, a rotor with a shaft and weighted body, a motor, and a resilient link between the shaft and the motor is positioned within the housing chamber. The vibrator also includes a resilient band to separate the vibrator from the housing inner surface. First and second adaptors are employed for the housing to be placed between the handle and the terminus of a concrete finishing tool.

18 Claims, 7 Drawing Sheets

Related U.S. Application Data abandoned, said application No. 14/304,019 is a continuation-in-part of application No. 13/947,720.

(56) References Cited

U.S. PATENT DOCUMENTS

| | | | | |
|---|---|---|---|---|
| 5,632,569 A * | 5/1997 | Szmansky | ............ | E04F 21/163 15/235.4 |
| 6,139,217 A * | 10/2000 | Reuter | ................. | E01C 19/402 404/114 |
| 2005/0036837 A1* | 2/2005 | Marshall | .................. | B25F 5/00 404/114 |
| 2008/0050177 A1* | 2/2008 | Sager | ................... | E04F 21/163 404/112 |

* cited by examiner

VIBRATOR MECHANISM USABLE WITH A CONCRETE FINISHING TOOL

CROSS-REFERENCE TO RELATED APPLICATIONS

The present application is a continuation-in-part of co-pending U.S. patent application Ser. No. 14/829,394 filed Aug. 18, 2015. Co-pending U.S. patent application Ser. No. 14/829,394 is a continuation-in-part of U.S. patent application Ser. No. 13/947,720 filed Jul. 22, 2013 and a continuation of U.S. Pat. No. 9,139,966 issued Sep. 22, 2015, which is also a continuation-in-part of U.S. patent application Ser. No. 13/947,720 filed Jul. 22, 2013.

FIELD OF THE INVENTION

The present invention relates to a novel and useful vibration departing device for a concrete finishing tool.

BACKGROUND OF THE INVENTION

Concrete finishing tools, such as floats, jointers, screeds and the like, are used to provide a particular finished surface adjusted to a freshly poured concrete mass. In the conventional method of use of such concrete finishing tools, an operator moves the tool across the surface of the freshly poured concrete, usually in a back and forth manner, before the concrete mass cures or dries.

It has also been recognized that the addition of a vibratory action to the concrete finishing tool aids in the creation of a surface, characteristic, such as a smooth surface and in the case of a jointer, possesses a groove to control cracking of the finish concrete slab.

In the past, various tools have been proposed to provide a vibration motion to concrete finishing tools. For example, U.S. Pat. Nos. 6,231,331, 6,988,851, 7,097,384, and 8,230,760 show concrete vibrating devices in which an external motor is mounted to a handle or shaft and linked to a remote vibration mechanism by the use of a cable or gear mechanism.

U.S. Pat. No. 6,139,217 shows a concrete finishing tool in which a power source is placed within the handle of the concrete finishing tool and provides power to vibrators that are located atop of the head of the finishing tool adjacent the concrete.

U.S. Pat. Nos. 5,632,569 and 7,465,121 show hand held cement and concrete finishing tools in which a vibrator is placed within the handle structure of the tools and powered by a battery that is also found in the handle. These tools do not show a method for controlling the vibration within the handle, other than by control of electrical power to the vibrating mechanism.

A vibration imparting device for a concrete finishing tool that is self-contained and between the handle and terminus of the concrete finishing tool and allows for optimum vibration of the vibrating mechanism would be a notable advance in the construction arts.

SUMMARY OF THE INVENTION

In accordance with the present invention a novel and useful vibration imparting device for a concrete finishing tool is herein provided.

The device of the present invention utilizes a housing having a chamber formed by an inner surface or wall of the housing. The housing is sized to accommodate a vibrator and an electrical battery to provide electrical power to the vibrator, and the vibrator can be selectively powered by the battery either with a switch physically present on the device or by remote control.

The vibrator, positioned within the chamber of the housing, includes a resilient collar that surrounds and contacts the vibrator in the housing inner wall. The resilient collar forms a spaced relationship between the vibrator and the housing inner surface within the chamber. In addition, an anchor holds the vibrator within the chamber in the spaced relationship formed by the collar lying between the housing inner surface and the vibrator.

A first adaptor removably connects the housing to the handle of the concrete finishing tool, while a second adaptor removably connects the housing to the terminus of the concrete finishing tool.

At least one spacer is interposed the electrical battery and the housing inner wall. A holder is also used to fix the electrical battery within the housing chamber. In this manner, the spacer and the holder obviates damage to the battery due to the vibratory motion and imparted by the vibrator.

Another embodiment of the present invention concerns a vibrator mechanism which may be employed with the housing and the first and second adaptors connecting the housing to the handle and the terminus of the concrete finishing tool. The vibrator mechanism utilizes a support that is located within the chamber of the housing. The support is formed with a bore through the same. A rotor is located within the bore of the support and is adapted to turn or rotate relative to the support. The rotor also includes a shaft that extends outwardly from the rotor, as well a weighted body that is connected to the rotor apart from the shaft, producing vibration.

The vibrator mechanism is also provided with a motor having an output shaft and utilizes a source of energy, such as the battery prior described. A resilient link, such as a spring or a coupler connects the outward shaft of the motor to the shaft of the rotor that extends from the support.

Such vibrator mechanism also includes a resilient band, such as an "O" ring, that at least partially surrounds the outer surface of the support and contacts the inner surface of the housing. Vibrations are transmitted to the housing from the rotor via such resilient band.

It may be apparent that a novel and useful vibration imparting device for a concrete finishing tool is hereinabove provided.

It is therefore an object of the present invention to provide a vibration imparting device for a concrete finishing tool that may be removably located between the handle and terminus of a concrete finishing tool.

Another object of the present invention is to provide a vibration imparting device for a concrete finishing tool that utilizes a vibrator that is resiliently suspended within a housing and allowed to impart vibration by the use of resilient collar placed between the inner wall of the housing and the vibrator.

Another object of the present invention is to provide a vibrator mechanism that includes a resilient band that transfers the vibrations to a housing and includes a resilient linkage between a motor shaft and a shaft of a rotor possessing an eccentric weight.

Another object of the present invention is to provide a vibration imparting device for a concrete finishing tool that is adaptable for various finishing tool termini such as floats, jointers, screeds, and the like.

A further object of the present invention is to provide a vibration imparting device for a concrete finishing tool that is simple to retrofit in a concrete finishing tool and is easy to operate and maintain for use.

Yet another object of the present invention is to provide a vibration imparting device for a concrete finishing tool that is relatively lightweight and easy to handle due to a compact structure.

The invention possesses other objects and advantages especially as concerns particular characteristics and features thereof which will become apparent as the specification continues.

For a better understanding of the invention reference is made to the following detailed description of the preferred embodiments of the invention which should be taken in conjunction with the above described drawings.

DETAILED DESCRIPTION OF THE INVENTION

Various aspects of the present invention will evolve from the following detailed description of the preferred embodiments thereof which should be referenced to the prior described drawings.

Figure 1:
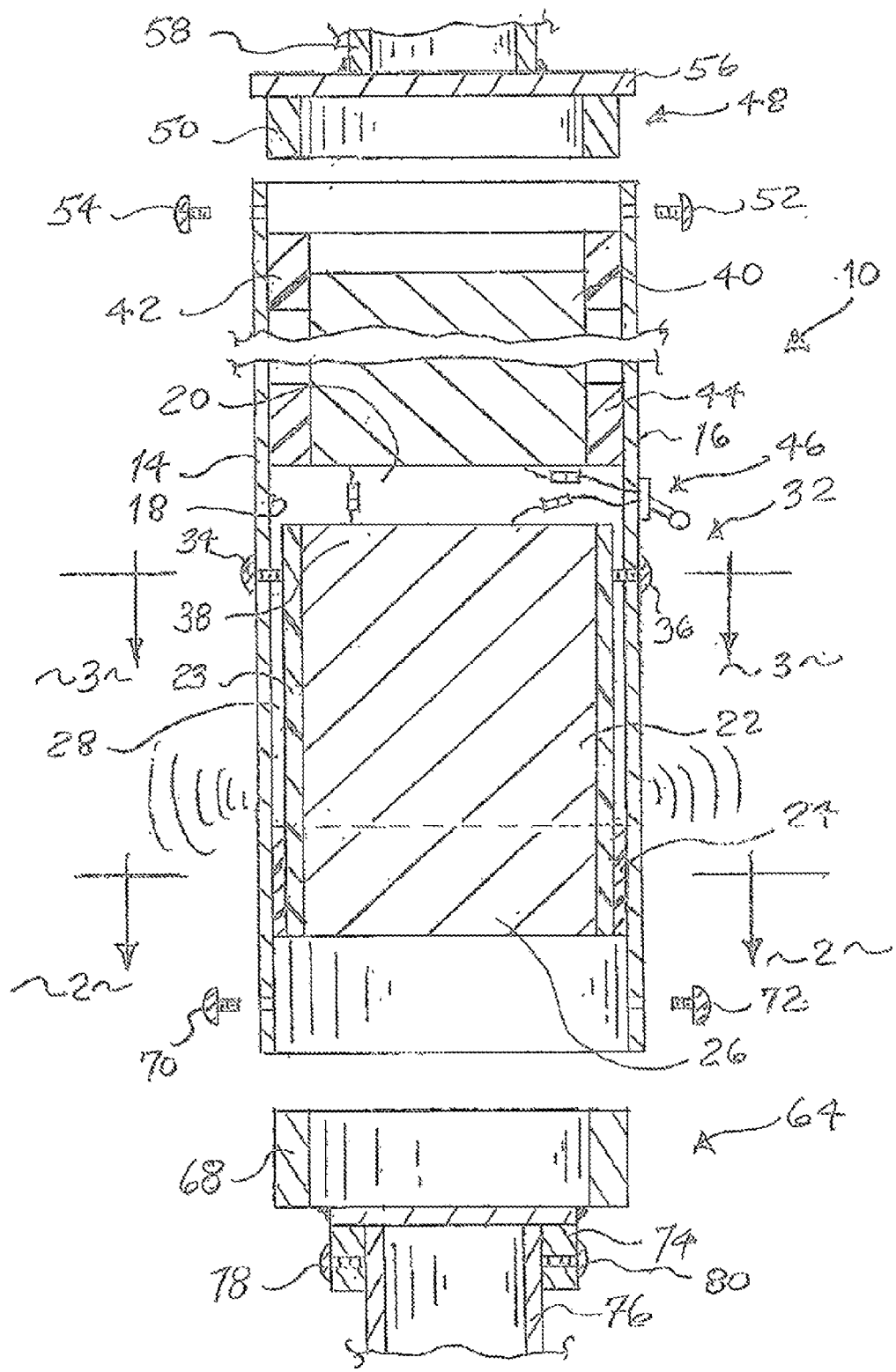
FIG. 1 is a partially exploded and broken sectional view of the vibration imparting device of the present invention interposed the handle and the terminus of a concrete finishing tool.

An embodiment of a vibrator mechanism as whole is depicted in the drawings by reference character 10. Device 10 is intended to impart vibration to a concrete finishing tool 12 shown in FIG. 4. As shown in FIG. 1, device 10 includes, as one of its elements, a housing 14 which may take the form of a cylindrical tube formed of any rigid or semi-rigid material, such as metal, plastic, wood, and the like. For example, aluminum tubing suffices in the construction of housing 14. Housing 14 is sized to accommodate installation in existing concrete finishing tools, which will be discussed in greater detail as the specification continues.

Figure 2:
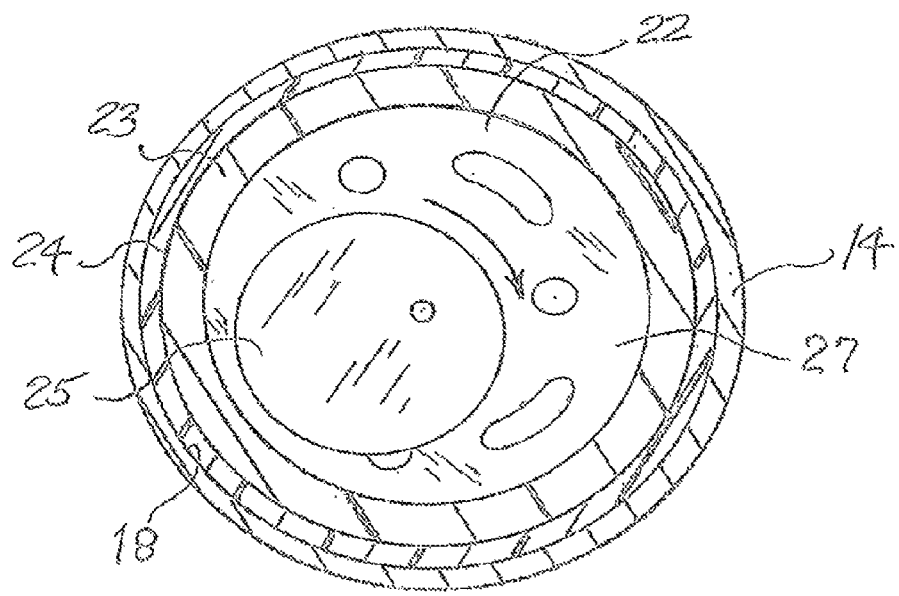
FIG. 2 is a sectional view taken along line 2-2 of FIG. 1.
Figure 3:
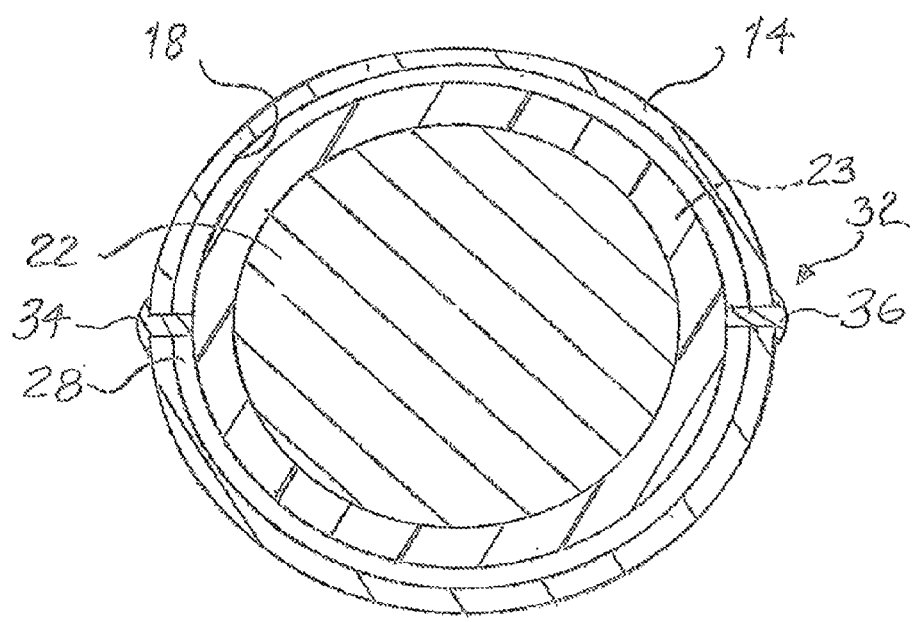
FIG. 3 is a sectional view taken along line 3-3 of FIG. 1.

Again, referring to FIG. 1, it may be observed that a vibrator 22 is position within chamber 20 of housing 14. Vibrator 22 may take the form of a vibrator sold under the designation "Grand Daddy Vibrator", model number TS770, 4.0-14 VDC, 1.4 inches diameter, sold by Surplus Traders, New York City, N.Y. Most importantly, vibrator is supported within chamber 40 by a resilient collar 24 which extends around vibrator 22 at end 26 thereof. Collar 24 may be constructed of rubber, plastic or other like material. Resilient collar 24 forms a space 28 between inner walls or surface 18 of housing 14 and vibrator 22, FIGS. 1 and 2. Thus, the vibrations indicated by vibration lines 30, FIG. 1, imparted by vibrator 22 are transmitted to housing 14 and to terminus of a finishing tool connected to housing 14 via resilient collar 24. As may be apparent from FIG. 2, vibrator 22 includes an outer plastic sheath 23 that directly contacts resilient collar 24. In addition, eccentric disc 25 of vibrator 22 is shown extended from motor plate 27. Eccentric disc turns per directional arrow 29 in creating vibrations. The connection of housing 14 to a concrete finishing tool 12 will be discussed hereinafter. An anchor 32 maintains the establishment of space 28 between vibrator 22 and housing 14. Anchor 32 is shown in FIGS. 1 and 3 as set screws 34 and 36 which extend through housing 14 and bear against end 38 of vibrator 22. In this manner, vibrator 22 is biased to move at end 26, nearest to finishing tool terminus 66, FIG. 4. Contact of vibrator 22 directly to inner surface 18 of housing 14 would greatly impede the imparting of vibration to finishing tool 12.

Figure 10:
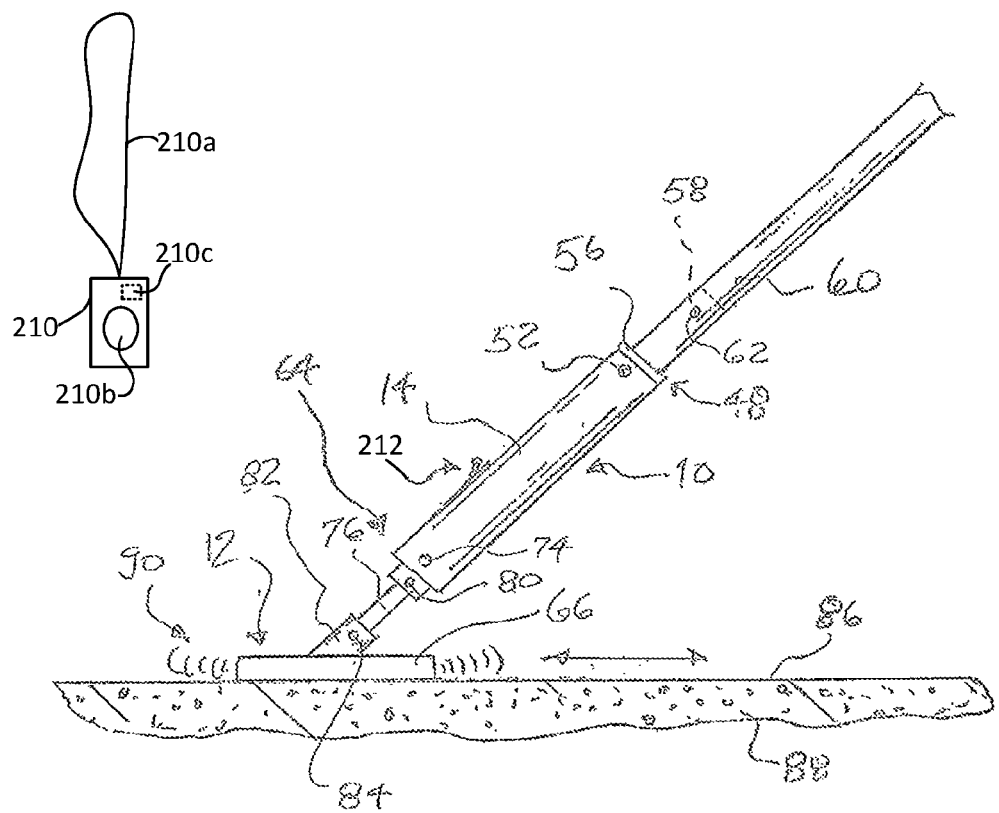
FIG. 10 is a side partial elevational view of a concrete finishing tool of the present invention with a remote activation device.

Returning to FIG. 1, it may be seen that an electrical battery 40 is also located in chamber 20 of housing 14. Electrical battery may take the form of a 14.4 volt NiCAD, 12 cell, 4,000 MAH, item number TEC90012, available from Batteries Plus of Rocklin, Calif. Battery 40 is positioned or fixed within chamber 20 against movement by the friction of spacers 42 and 44 mounted to the end portions of electrical battery 14. Consequently, electrical battery 14 fits snuggly within chamber 20 of housing 14. However, additional screws may be passed through housing 14 to engage spacers 42 and 44 to prevent slippage of electrical battery 40 within chamber 20 (not shown). An electrical switch and conventional connectors 46 electrically connect electrical battery 40 to vibrator 22 and permit the selective activation of vibrator 22 from the exterior of housing 14. Alternatively and preferably, as shown in FIG. 10, electrical switch may comprise a wirelessly-operated switch 212 that wirelessly communicates with an activation device 210. Activation device 210 preferably comprises a wireless transmitter 210c for transmitting a wireless signal to switch 212 and a button 210b, microphone, sensor, or other component that allows the operator of the tool to instruct that a wireless signal be transmitted. Switch 212 likewise comprises a receiver for receiving the wireless signal from activation device 210. Activation device 210 may be worn by the operator of the tool such as with a lanyard 210a as shown in FIG. 10 or it may be handheld, attached to another device, or otherwise remotely located.

A first adaptor 48 is also found in device 10 and includes a flange 50 that fits within chamber 20 within housing 14. Set screws 52 and 54 extending through housing 14 engage flanges 50 when it is placed within chamber 14 in order to hold first adaptor to housing 14. First adaptor also includes a plate 56 and a tube 58 which is welded to plate 56. Tube 58 is intended to be connected to the handle 60 of concrete finishing tool 12, FIG. 4, and, in the embodiment depicted in the drawings, serves as a female end to device 10. A set screw 62 passes through handle 60 and engages tube 58 in order to hold device 10 to handle 60.

Figure 4:
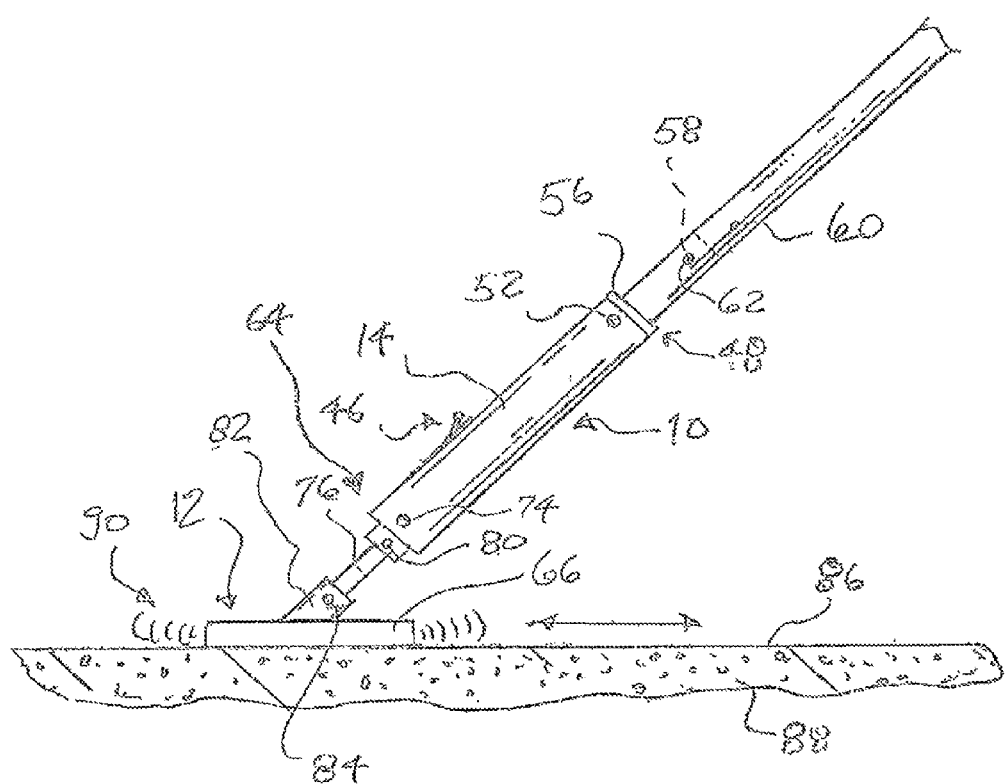
FIG. 4 is a side partial elevational view of a concrete finishing tool with the device for imparting vibration of the present invention installed therein.

A second adaptor 64, FIG. 1, connects device 10 to the terminus 66 of concrete finishing tool 12. Concrete finishing tool 12 is depicted in FIG. 4, as being a float. Adaptor 64 includes a flange 66 that fits within chamber 20 of housing 14 and is fixed there within by set screws 70 and 72. A hollow boss 74 is welded to flange 68 and includes a tube 76 which extends outwardly from the same. Set screws 78 and 80 hold tube 76 within hollow boss 74. Referring to FIG. 4, it may be observed that tube 76 serves as a male fitting and fits within a coupler 82 of concrete finishing tool terminus 66. A set screw 84 holds tube 76 to terminus 66 and, thus, holds device 10 to terminus 66. It should be realized that a conventional spring loaded button on tube 76 may interact with an opening in coupler 82 of terminus 66 to serve as a quick installing and removing mechanism in substitution for set screw 84.

Figure 5:
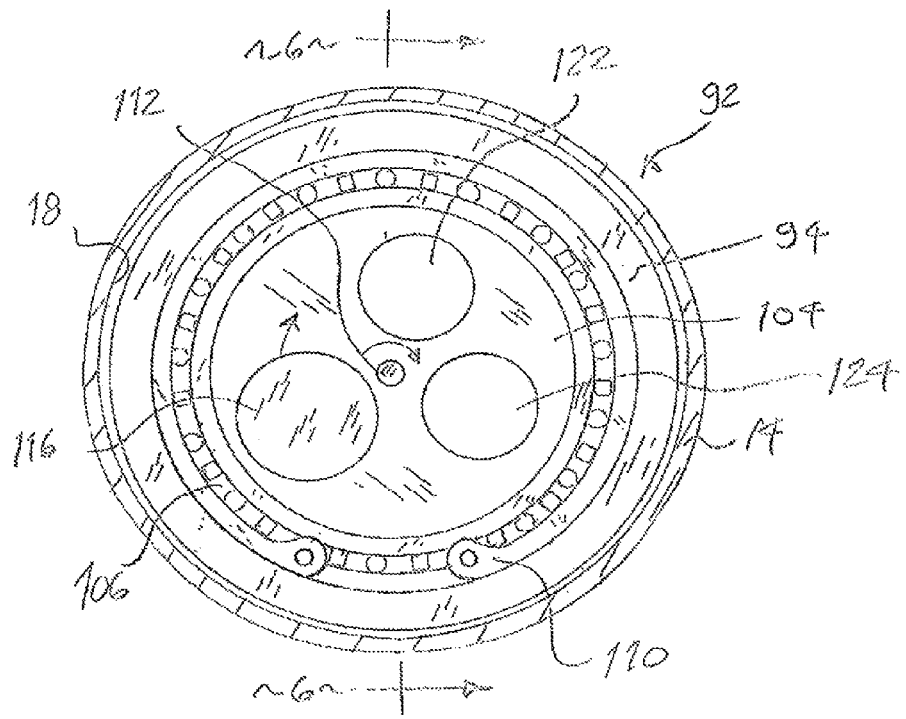
FIG. 5 is a front elevational view of another embodiment of a vibrator mechanism usable in the tool of the present application, with the housing depicted in section.
Figure 6:
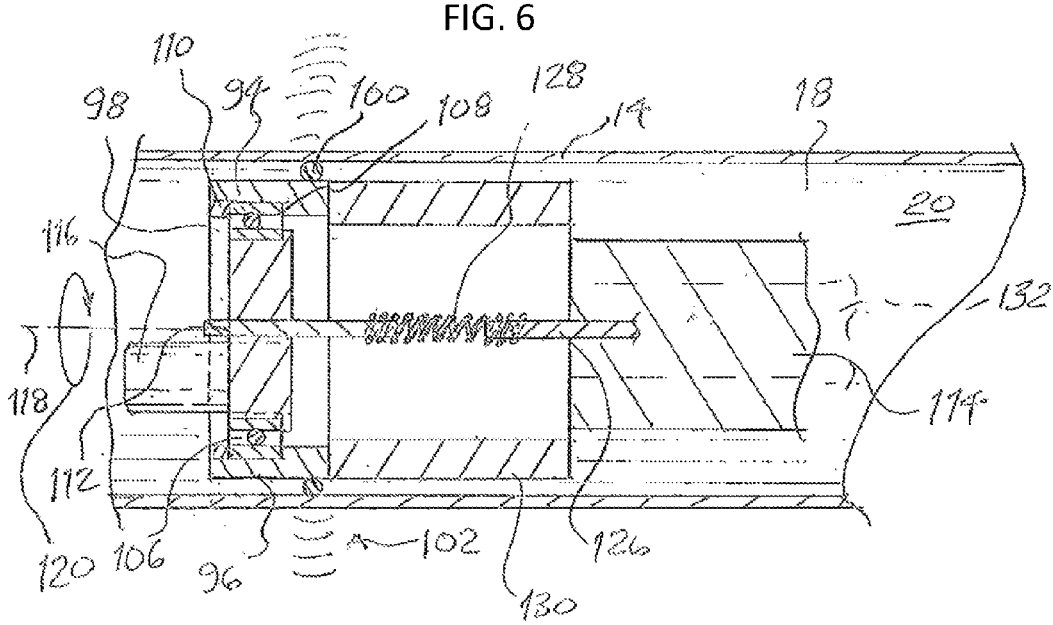
FIG. 6 is a sectional view taken along line 6-6 of FIG. 5.
Figure 7:
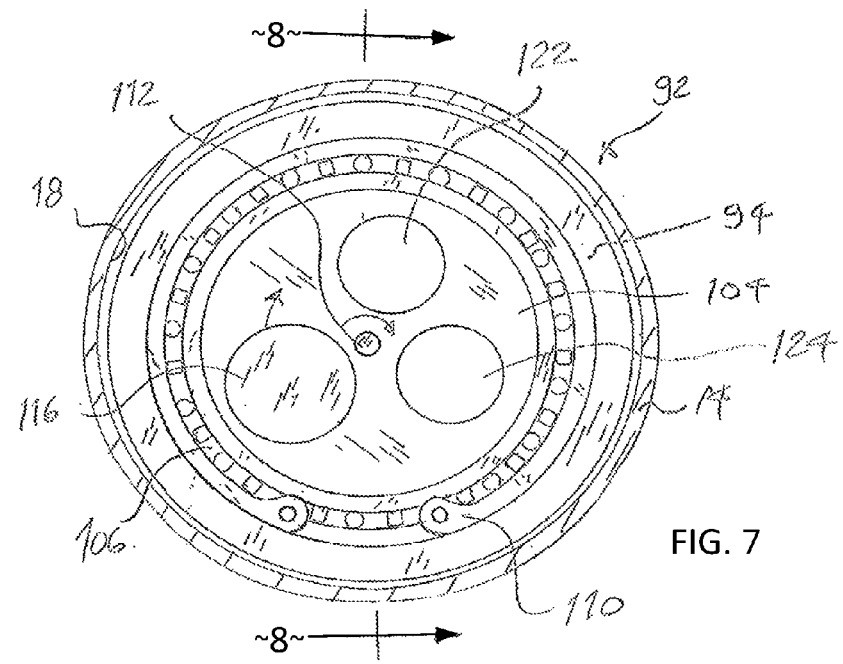
FIG. 7 is a front elevational view of another embodiment of a vibrator mechanism usable in the tool of the present application, with the housing depicted in section.

Viewing now FIGS. 5 and 6, another embodiment 92 of a vibrator mechanism is depicted. Vibrator mechanism 92 is employed as an alternate to the vibration imparting device 10 within housing 14, FIG. 1. In other words, vibrator mechanism 92 would be used in device 10 in place of vibrator and motor 22 depicted in FIG. 1. Also, it should be realized that vibrator mechanism 92 would be connected to terminus 66 and handle 60 via the connection mechanism depicted in FIGS. 1-4 for use in concrete finishing tool 14. Vibrator mechanism 92 includes as one of its elements a support 94 which is located within housing chamber 20. Support 94 includes an outer surface 96 and a bore 98 there through. "O" ring 100 serves to transmit vibration from vibration mechanism 92 to housing 14 as part of the concrete finishing tool 14 when used with wet concrete, schematically illustrated by vibration lines 102, FIG. 6.

Figure 8:
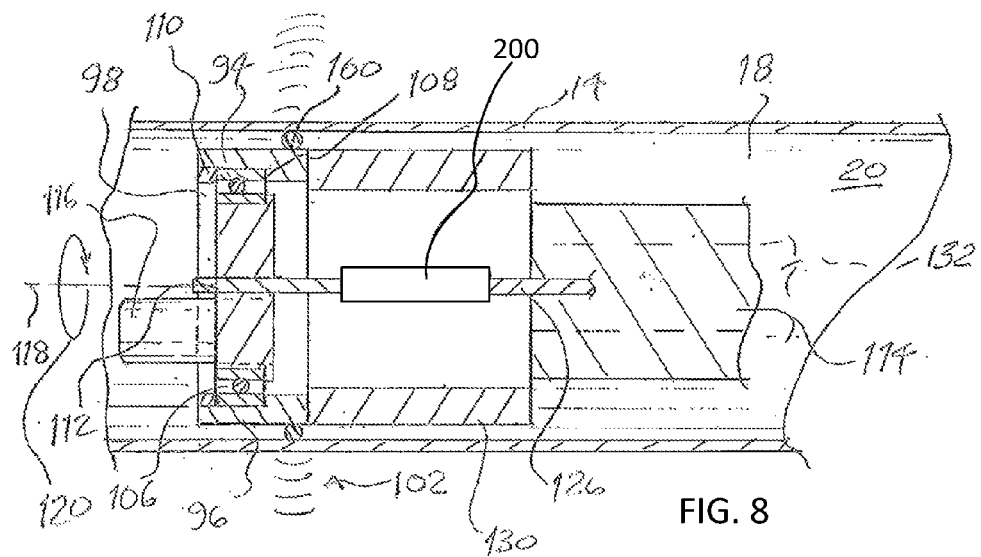
FIG. 8 is a sectional view taken along line 8-8 of FIG. 7.
Figure 9:
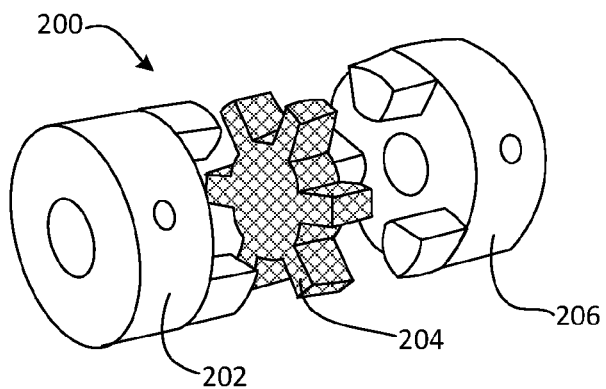
FIG. 9 is a perspective view of a coupler useful with the embodiment shown in FIG. 7.
Figure 11:
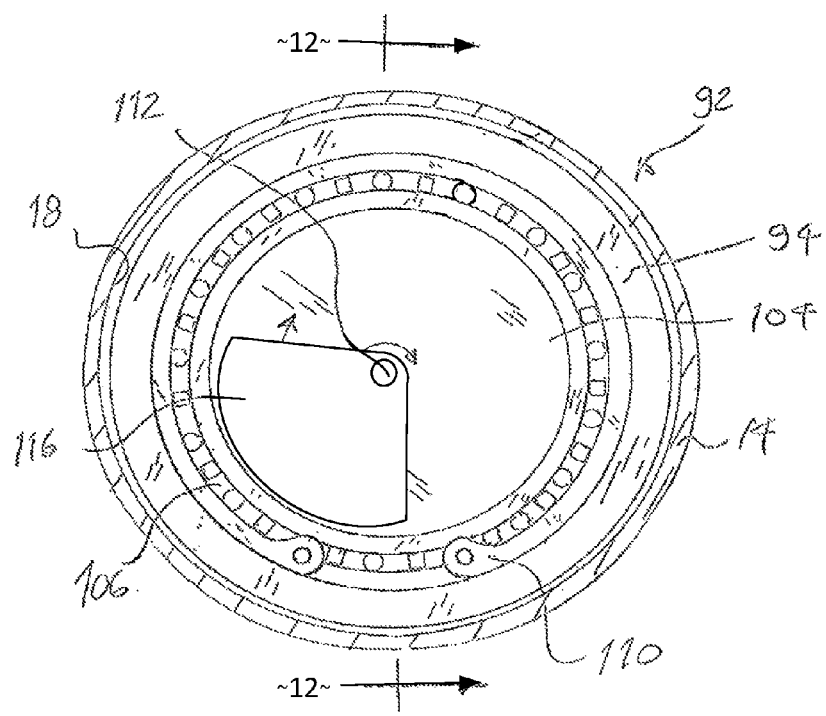
FIG. 11 is a front elevational view of another embodiment of a vibrator mechanism usable in the tool of the present application, with the housing depicted in section.
Figure 12:
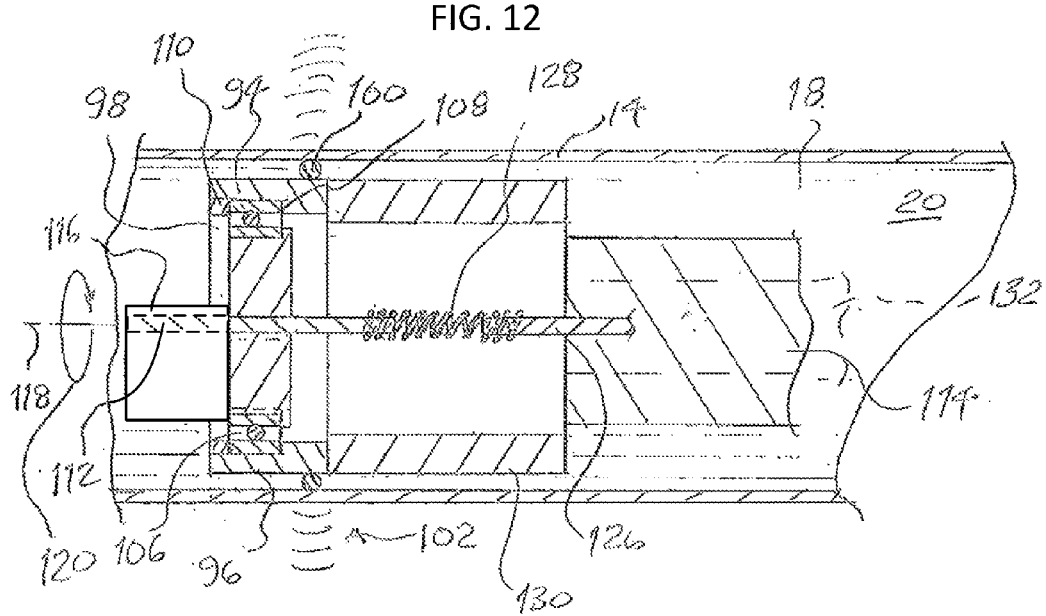
FIG. 12 is a sectional view taken along line 12-12 of FIG. 11.

Referring again to FIGS. 5 and 6, a rotor 104 lies within bore 98 of support 94. A roller bearing 106 interspaces roller bearing 106 and support 94. Specifically, roller bearing 106 lies against a shoulder 108 of support 94, best shown in FIG. 6, and a spring clip 110. Rotor 104 is also fashioned with a shaft 112 that extends into chamber 20 toward motor 114, which may be battery operated in the same manner as vibrator 22 depicted in FIG. 1. In addition, rotor 104 includes a weighted body 116 that is embedded in rotor 104 and lies apart from shaft 112 in an eccentric manner. Needless to say, shaft 116 rotates about an axis 118 according to directional arrow 120, FIG. 6, to generate vibrations. Openings 122 and 124 pass through rotor 122 and serve as access openings to chamber 20 of housing 14. Alternatively, as shown in FIGS. 11 and 12, in another embodiment of vibrating mechanism 92, weighted body 116 has a perimeter that is pie or wedge shaped, and shaft 112 extends at least partially through weighted body 116 or entirely through weighted body 116. In this embodiment, weighted body 116 is preferably press fit on top of a bushing (not shown) on shaft 112 and does not need to be embedded in rotor 104. This embodiment can be used with any type of resilient link 128 as described below, including a spring as shown in FIG. 6 or a coupler as shown in FIGS. 8 and 9. Further with the embodiment of vibrating mechanism 92 shown in FIGS. 11 and 12, openings 122 and 124 are optional.

Referring again to FIG. 6, it may be observed that motor 114 includes an output shaft 126. A resilient link 128 connects shaft 112 of rotor 104 to output shaft 126 of motor 114. Resilient link 128 may take the form of a coil spring as shown in FIG. 6, as a coupler 200 as shown in FIGS. 8 and 9, or as any other component capable of connecting two shafts in a resilient manner. For example, coupler 200 comprises a first coupling hub 202 with one or more teeth (not labelled) that connects to shaft 112 of rotor 104, a second coupling hub 206 with one or more teeth (not labelled) that connects to shaft 126 of motor 114, and a spider, star, or other elastomer insert 204 that fits between coupling hubs 202 and 206 and among their teeth to connect the two shafts while protecting motor 114 from the vibration generated by rotor 104 when it rotates. Useful couplers include, for example, plum couplers, spider couplers, flexible shaft couplers, disc couplers, and jaw couplers. Any resilient link that somewhat isolates motor 114 from rotating rotor 104, however, is acceptable. Mount 130 connects to support 94 and serves to hold motor 114 in place by a pair of flanges, one flange 132 being shown in phantom on FIGS. 6 and 8.

A resilient band, that may be in the form of an "O" ring 100, surrounds support 94 and contacts the inner surface 18 of housing 14 and the outer surface 96 of support 94. Vibrations generated by rotor 104 are transmitted from rotor 104 and rotor support 94 to housing 14.

In operation, the user inserts device 10 between handle 60 and terminus 66 of concrete finishing tool, FIG. 4. Tube 58 of first adaptor 48 fits within hollow handle 60. Likewise, second adaptor 64 allows the connection of device 10 to terminus 66 of concrete finishing tool 10 by the use of a tube 76 which fits into hollow adaptor 84 of terminus 66. Set screws 62 and 84 connect adaptors 48 and 64 to handle 60 and terminus 66 of concrete finishing tool 12, respectively. Once device 10 is installed as shown in FIG. 4, the concrete finishing tool 12 is moved along the surface 86 of soft concrete mass 88 to effect the particular finish on surface 86. In the instance where concrete finishing tool is a float, as shown in FIG. 4, a smooth surface 86 is produced. However, other concrete finishing tools may be employed to produce a rough surface or to create grooves in concrete mass 80, as is the case with a jointer. Nevertheless, vibrations originated from vibrator 22 within casing 14 of device are biased for transmission through adaptor 64 to concrete finishing tool 12 is indicated by vibration lines 90.

In addition, device 10 would operate in a similar manner by the use of vibrator mechanism 92 depicted in FIGS. 5 and 6 in substitution for vibrator 22 by placing vibrator mechanism 92 within housing 14.

While in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

I claim:

1. A vibrator mechanism usable with a concrete finishing tool having a handle and a terminus, comprising:
   a. a housing, wherein the housing defines a chamber formed by an inner surface of the housing;
   b. a vibrator positioned within the chamber of the housing wherein the vibrator comprises:
      i. a support, wherein the support defines a bore there through and comprises an outer surface;
      ii. a rotor located within the bore of the support and being adapted to turn relative to said support, wherein the rotor comprises a shaft extending outwardly from the rotor and a weighted body connected to the rotor;
      iii. a motor comprising an output shaft; and
      iv. a coupler connecting the output shaft of the motor to the rotor shaft; and
   c. a resilient band at least partially surrounding the outer surface of the support of the vibrator and contacting the inner surface of the housing; wherein the coupler is chosen from the group comprising plum couplers, spider couplers, disc couplers and jaw couplers.

2. The mechanism of claim 1 further comprising a first adaptor configured to removably secure the housing to the handle of the concrete finishing tool and a second adaptor configured to removable secure the housing to the terminus of the concrete finishing tool.

3. The mechanism of claim 1 further comprising an anchor positioned in the housing and configured to hold the vibrator within the chamber at a spaced relationship from the inner surface of the housing.

4. The mechanism of claim 3 wherein the anchor comprises at least one set screw.

5. The mechanism of claim 1 further comprising a battery positioned in the housing chamber adjacent to the vibrator and in electrical communication with the motor of the vibrator.

6. The mechanism of claim 5 further comprising a remote controlled switch positioned in the housing chamber and in electrical communication with the battery and motor, wherein the remote controlled switch receives signals from a remote activation device and activates the motor according to the signals received from the remote activation device.

7. The mechanism of claim 5 further comprising at least one spacer positioned between the battery and the housing wall.

8. The mechanism of claim 5 further comprising a holder configured to secure the battery in the housing chamber.

9. The mechanism of claim 8 wherein the holder comprises at least one set screw.

10. The mechanism of claim 1 wherein the vibrator further comprises a bearing positioned between the support and the rotor.

11. The mechanism of claim 1 wherein the resilient band comprises an "O" ring.

12. A vibrator mechanism usable with a concrete finishing tool having a handle and a terminus, comprising:
   a. a housing, wherein the housing defines a chamber formed by an inner surface of the housing;
   b. a vibrator positioned within the chamber of the housing wherein the vibrator comprises:
      i. a support, wherein the support defines a bore there through and comprises an outer surface;
      ii. a rotor located within the bore of the support and being adapted to turn relative to said support, wherein the rotor comprises a shaft extending outwardly from the rotor and a weighted body connected to the rotor;
      iii. a motor comprising an output shaft; and
      iv. a coupler connecting the output shaft of the motor to the rotor shaft;
   c. a resilient band at least partially surrounding the outer surface of the support of the vibrator and contacting the inner surface of the housing;
   d. an anchor positioned in the housing and configured to hold the vibrator within the chamber at a spaced relationship from the inner surface of the housing;
   e. a battery positioned in the housing chamber adjacent to the vibrator and in electrical communication with the motor of the vibrator; and
   f. a remote controlled switch positioned in the housing chamber and in electrical communication with the battery and motor, wherein the remote controlled switch receives signals from a remote activation device and activates the motor according to the signals received from the remote activation device.

13. The mechanism of claim 12 further comprising:
   a. a first adaptor configured to removably secure the housing to the handle of the concrete finishing tool; and
   b. a second adaptor configured to removable secure the housing to the terminus of the concrete finishing tool.

14. The mechanism of claim 12 further comprising at least one spacer positioned between the battery and the housing wall.

15. The mechanism of claim 12 further comprising a holder configured to secure the battery in the housing chamber.

16. The mechanism of claim 15 wherein the holder comprises at least one set screw.

17. The mechanism of claim 12 wherein the vibrator further comprises a bearing positioned between the support and the rotor.

18. The mechanism of claim 12 wherein the resilient band comprises an "O" ring.

* * * * *